United States Patent
Douglas et al.

(10) Patent No.: US 11,524,403 B2
(45) Date of Patent: Dec. 13, 2022

(54) VACUUM-BASED END EFFECTOR FOR ENGAGING PARCELS

(71) Applicant: Material Handling Systems, Inc., Mt. Washington, KY (US)

(72) Inventors: Josiah Douglas, Louisville, KY (US); Kurt Michael Wittmer, Louisville, KY (US); Michael Alan McCue, Louisville, KY (US); David W. Caldwell, II, Louisville, KY (US); Gregory Robert Sturm, Simpsonville, KY (US); Derek Robert Sturm, Louisville, KY (US); Thomas Anthony Hillerich, Jr., Louisville, KY (US)

(73) Assignee: Material Handling Systems, Inc., Mt. Washington, KY (US)

( * ) Notice: Subject to any disclaimer, the term of this patent is extended or adjusted under 35 U.S.C. 154(b) by 441 days.

(21) Appl. No.: 16/793,902

(22) Filed: Feb. 18, 2020

(65) Prior Publication Data

US 2020/0262069 A1    Aug. 20, 2020

Related U.S. Application Data

(60) Provisional application No. 62/807,853, filed on Feb. 20, 2019.

(51) Int. Cl.
  *B25J 15/06*  (2006.01)
  *B25J 9/16*   (2006.01)
  (Continued)

(52) U.S. Cl.
  CPC ......... *B25J 9/1669* (2013.01); *B25J 15/0683* (2013.01); *B25J 15/0691* (2013.01);
  (Continued)

(58) Field of Classification Search
  CPC ......... E02F 3/7609; E02F 9/205; E02F 3/841; E02F 3/7604; E02F 9/261; E02F 9/26;
  (Continued)

(56) References Cited

U.S. PATENT DOCUMENTS

| | | | |
|---|---|---|---|
| 5,079,903 A | 1/1992 | Hakansson | |
| 7,076,335 B2 * | 7/2006 | Seemann | B62D 57/00 901/1 |

(Continued)

FOREIGN PATENT DOCUMENTS

| | | |
|---|---|---|
| CN | 206811992 U | 12/2017 |
| EP | 3290167 A1 | 3/2018 |

(Continued)

OTHER PUBLICATIONS

Naito et al., Development of minimally invasive lifting device using extension and flexion of pneumatic soft actuator for laparoscopic surgery, 2018, IEEE, pg. (Year: 2018).*

(Continued)

*Primary Examiner* — Mcdieunel Marc
(74) *Attorney, Agent, or Firm* — Stites & Harbison, PLLC; David W. Nagle, Jr.; Gary N. Stewart

(57) ABSTRACT

A vacuum-based end effector for engaging parcels includes a base plate, one or more vacuum cups of a first type, and one or more vacuum cups of a second type. Each vacuum cup of the vacuum-based end effector is configured to be placed in fluid communication with a vacuum source to provide the vacuum cup with a suction force which can be used to engage and grasp parcels. Each vacuum cup includes a bellows defining a pathway for a flow of air and a lip connected to the bellows. Each lip of the one or more vacuum cups of the first type comprises a foam lip, and each lip of the one or more vacuum cups of the second type comprises an elastomeric lip. The vacuum-based end effec- (Continued)

tor can be combined with a robot to provide an improved system for engaging parcels.

18 Claims, 9 Drawing Sheets

(51) Int. Cl.
    *B25J 19/02*     (2006.01)
    *B65G 47/91*     (2006.01)

(52) U.S. Cl.
    CPC .............. *B25J 19/02* (2013.01); *B25J 19/021* (2013.01); *B25J 19/026* (2013.01); *B65G 47/917* (2013.01); *B65G 2201/0285* (2013.01); *B65G 2203/042* (2013.01); *B65G 2203/044* (2013.01)

(58) Field of Classification Search
    CPC . H04N 7/18; B60R 11/0235; B60R 2300/802; B60R 2300/105; B60Y 2200/412; B62D 57/00; B62D 57/024; B62D 55/00; B62D 55/075; B62D 55/265; B64F 5/30; B64F 5/60; B63B 59/10; A47L 1/02; A47L 2201/00; E04G 23/002; G05D 1/0236; G05D 2201/0203
    See application file for complete search history.

(56) References Cited

U.S. PATENT DOCUMENTS

| | | | | |
|---|---|---|---|---|
| 7,079,923 | B2 * | 7/2006 | Abramson | G05D 1/0272 |
| | | | | 700/254 |
| 7,167,775 | B2 * | 1/2007 | Abramson | F04D 29/281 |
| | | | | 701/25 |
| 7,346,428 | B1 * | 3/2008 | Huffman | A47L 11/4011 |
| | | | | 701/301 |
| 9,457,477 | B1 | 10/2016 | Rublee et al. | |
| 9,498,887 | B1 | 11/2016 | Zevenbergen et al. | |
| 10,646,898 | B2 | 5/2020 | Hillerich, Jr. et al. | |
| 2003/0048081 | A1 * | 3/2003 | Seemann | B62D 57/00 |
| | | | | 318/68 |
| 2013/0041495 | A1 | 2/2013 | Moore et al. | |
| 2019/0030730 | A1 | 1/2019 | Tanaka et al. | |
| 2020/0000302 | A1 * | 1/2020 | Morin | A47L 11/4088 |

FOREIGN PATENT DOCUMENTS

| | | |
|---|---|---|
| JP | 2018-103317 A | 7/2018 |
| JP | 2019-005869 A | 1/2019 |
| KR | 10-1078409 B1 | 10/2011 |
| WO | 2013/034634 A1 | 3/2013 |

OTHER PUBLICATIONS

Miyake et al., Vacuum-based wet adhesion system for wall climbing robots—Lubricating action and seal action by the liquid, 2009, IEEE, p. 1824-1829 (Year: 2009).*

Miyake et al., Basic research on vacuum-based wet adhesion system for wall climbing robots—Measurement of lubricating action and seal action by the liquid, 2009, IEEE, p. 616-621 (Year: 2009).*

Korean Intellectual Property Office, International Search Report and Written Opinion issued in corresponding Application No. PCT/US2020/018661, dated Jun. 17, 2020.

European Patent Office, Supplementary European Search Report issued in corresponding Application No. EP 20758755, dated Oct. 18, 2022.

* cited by examiner

VACUUM-BASED END EFFECTOR FOR ENGAGING PARCELS

CROSS-REFERENCE TO RELATED APPLICATIONS

The present application claims priority to U.S. Patent Application Ser. No. 62/807,853 filed Feb. 20, 2019, the entire disclosure of which is incorporated herein by reference.

BACKGROUND OF THE INVENTION

The present invention relates to vacuum-based end effectors that are useful for engaging parcels within a sorting or similar facility.

In a sorting facility for parcels, various parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the various parcels within the facility.

One such piece of equipment is an end effector, which can be attached to a robot and maneuvered to grasp or engage the parcels that are placed on the conveyers of the systems. In this regard, a number of different systems utilizing different end effectors exist in the art. For example, one such system is described in U.S. Patent Application Publication No. 2018/0345324, which is incorporated herein by reference, in which an end effector with a number of vacuum cups is attached to a robot for engaging parcels. However, as the parcels moving through a given sorting facility have a number of different shapes and sizes and are in packaging ranging from rigid cardboard boxes to flexible plastic ("poly") bags or other flexible materials, current end effectors are generally not capable of or are not readily configured to effectively and adequately grasp or engage each and every type of parcel. For example, vacuum-based end effectors of known construction may be unable to sufficiently grasp flexible plastic ("poly") bags or similar parcels in flexible packaging materials that may have a wrinkled or non-uniform surface.

Accordingly, there remains a need for improvements in end effectors for effectively grasping or engaging parcels in a sorting or similar facility.

SUMMARY OF THE INVENTION

The present invention is a vacuum-based end effector for engaging parcels that includes different vacuum cups to grasp and/or engage parcels of various shapes, sizes, and construction.

The vacuum-based end effector of the present invention is configured for mounting to a robot, or a portion thereof, to provide an improved system for engaging parcels. Furthermore, the vacuum-based end effector includes one or more vacuum cups of a first type and one or more vacuum cups of a second type.

Each vacuum cup of the one or more vacuum cups of the first type and the one or more vacuum cups of the second type is configured to be placed in fluid communication with a vacuum source to provide the vacuum cup with a suction force which can be used to grasp parcels. Each vacuum cup of the first type and each vacuum cup of the second type generally includes a bellows and a lip. The bellows of each vacuum cup in the end effector defines a pathway for a flow of air and has a proximal end operably connected to a base plate and a distal end to which the lip of the vacuum cup is connected. Each lip of the one or more vacuum cups of the first type comprises a foam lip to provide a surface particularly well-suited for parcels in flexible packaging materials, such as plastic ("poly") bags, while each lip of the one or more vacuum cups of the second type comprises an elastomeric lip to provide a surface particularly well-suited for engaging parcels including dull or glossy paper-based materials. The vacuum-based end effector is thus able to engage parcels constructed of various materials.

In some embodiments, the vacuum-based end effector includes a plurality of vacuum cups of the first type and a plurality of vacuum cups of the second type. In such embodiments, the vacuum cups of the first type can be placed in an alternating configuration with the vacuum cups of the second type around the perimeter of the base plate, so that, when the vacuum-based end effector is placed on a tilted axis, the vacuum cups are oriented such that the lowest point of the end effector includes at least one vacuum cup of the first type and at least one vacuum cup of the second type. In instances where a varied mix of parcels requires sorting, the alternating configuration of vacuum cups of the first type and vacuum cups of the second type serves to increase the chance of a contact between a given parcel and a vacuum cup having a lip well-suited to engage the parcel. In this regard, in some embodiments, a vacuum cup of either the first type or the second type is also connected to a center of the base plate to provide a surface suitable for engaging parcels between the opposing vacuum cups arranged around the perimeter of the base plate. Preferably, the vacuum cups of the first type and the vacuum cups of the second type are adjustably connected to the base plate, such that the spacing between vacuum cups of the end effector can be adjusted.

To detect pneumatic engagement of the vacuum-based end effector with a parcel, in some embodiments, the end effector further includes one or more vacuum sensors. Each vacuum sensor is operably connected to one or more vacuum cups in the end effector and is configured to provide vacuum pressure feedback indicative of whether the vacuum cups to which the vacuum sensor is operably connected has pneumatically engaged with a parcel. Preferably, each vacuum cup has a vacuum sensor corresponding and operably connected thereto, such that the pneumatic engagement of each vacuum cup of the end effector can be independently assessed.

To detect the proximity of parcels relative to the end effector, in some embodiments, the end effector further includes one or more proximity sensors configured to detect the presence of a parcel relative to the end effector.

In some embodiments, the above-described vacuum sensors and proximity sensors of the vacuum-based end effector are operably connected to a controller to provide a control subsystem which can be used to regulate movement of the end effector (e.g., by communicating instructions to a motor control system operably connected to the robot to which the end effector is mounted) based on data from the sensors.

DETAILED DESCRIPTION OF THE INVENTION

The present invention is a vacuum-based end effector for engaging parcels that includes different vacuum cups to grasp and/or engage parcels of various shapes, sizes, and construction.

Figure 1:
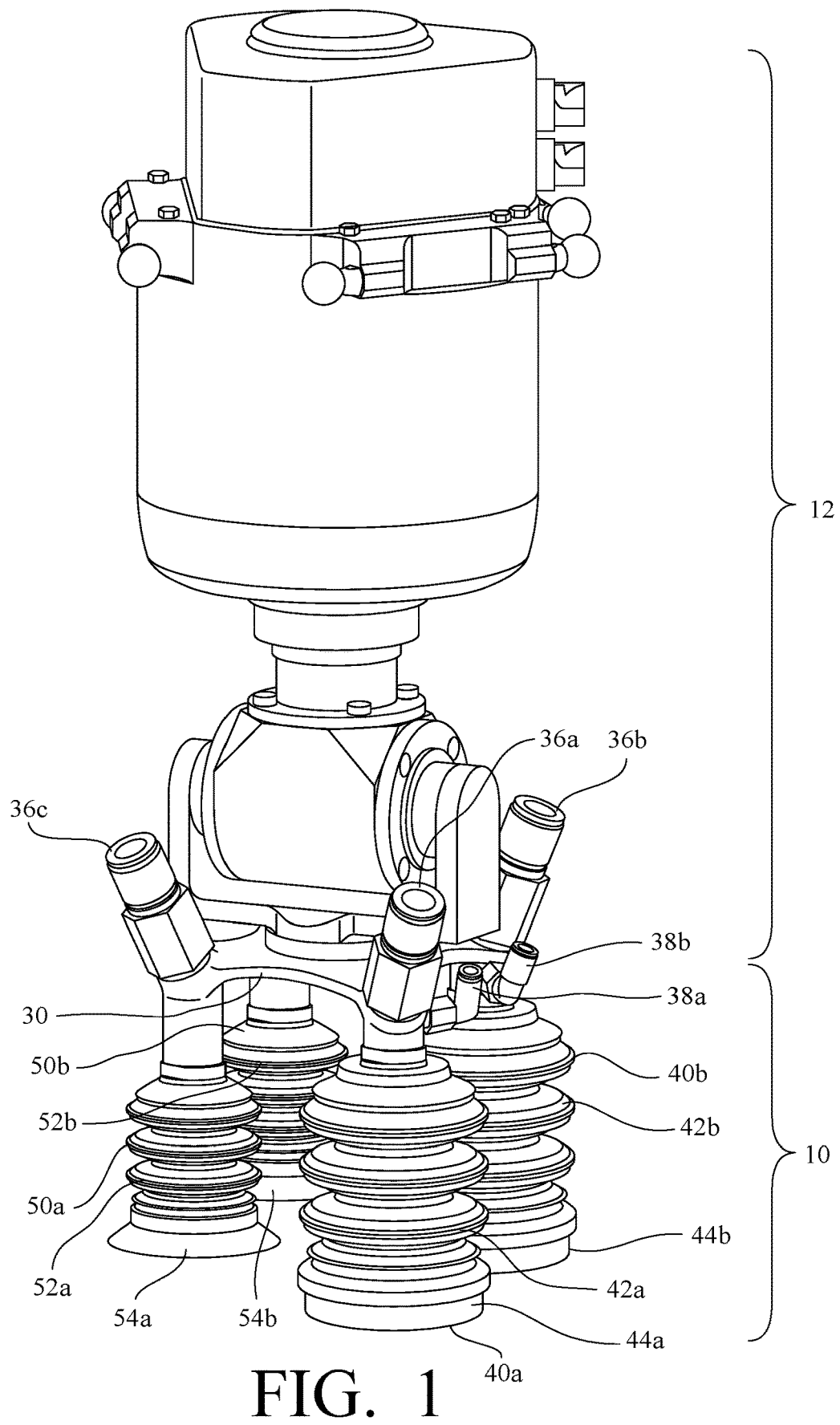
FIG. 1 is a perspective view of an exemplary vacuum-based end effector for engaging parcels made in accordance with the present invention mounted to a portion of a robot.

FIG. 1 is a perspective view of an exemplary vacuum-based end effector 10 (or end effector 10) for engaging parcels made in accordance with the present invention. The end effector 10 is configured for mounting to a portion of a robot 12. It should appreciated that the portion of a robot 12 shown in FIG. 1 may be a component, such as a robotic arm, of a larger robot or robotic system, which is configured to move the end effector 10 to selectively engage parcels. For example, the portion of the robot 12 may be a component of a Delta P6 robot manufactured by Schneider Electric and available, for instance, from Advantage Industrial Automation of Duluth, Ga. As further discussed below with reference to FIG. 9, movement of such a robot can be, in some embodiments, regulated, at least in part, by a control subsystem to which the robot is operably connected.

Figure 2:
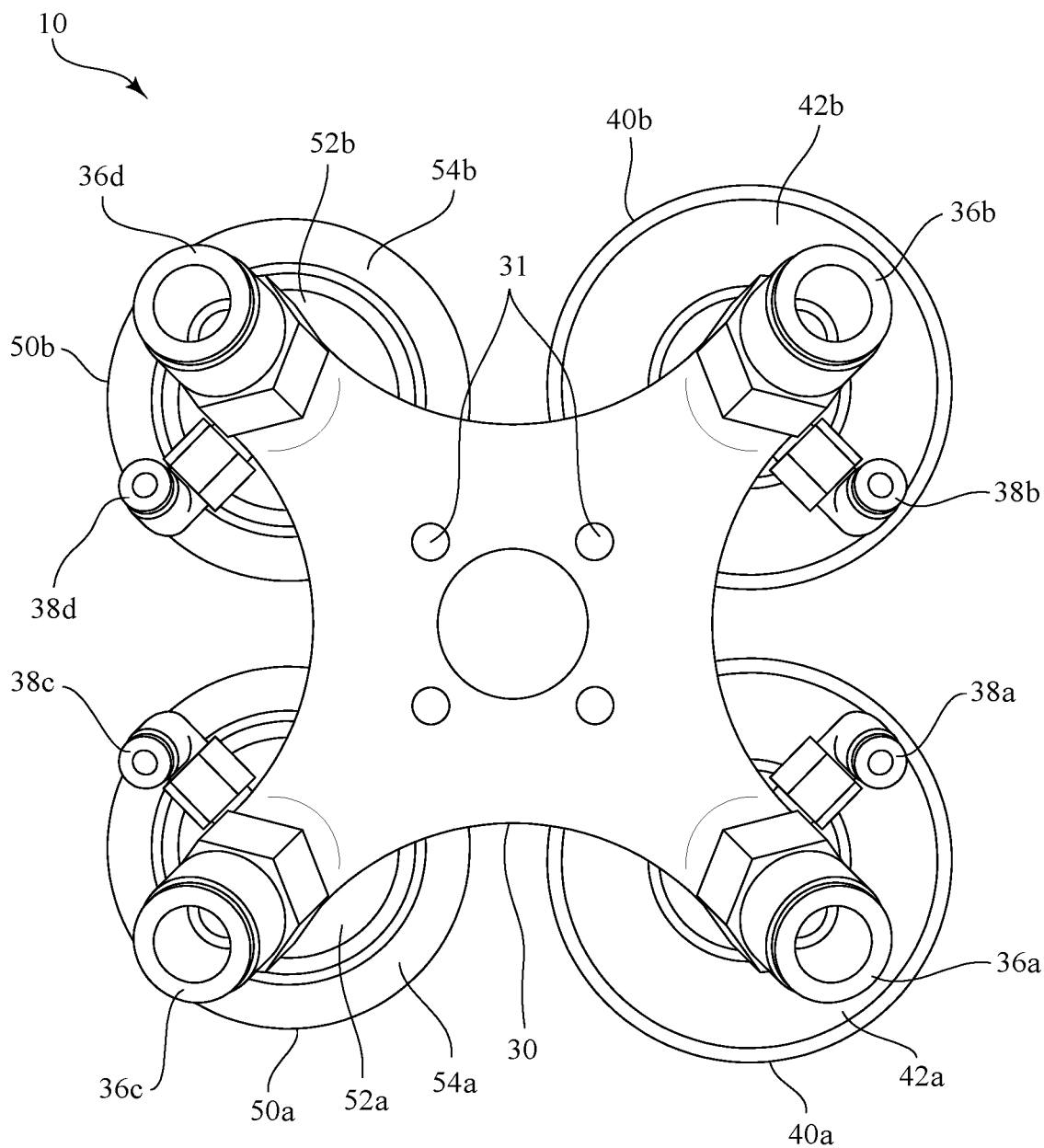
FIG. 2 is a top view of the exemplary vacuum-based end effector of FIG. 1, with the portion of the robot and certain components of the exemplary vacuum-based end effector hidden from view for clarity.
Figure 3:
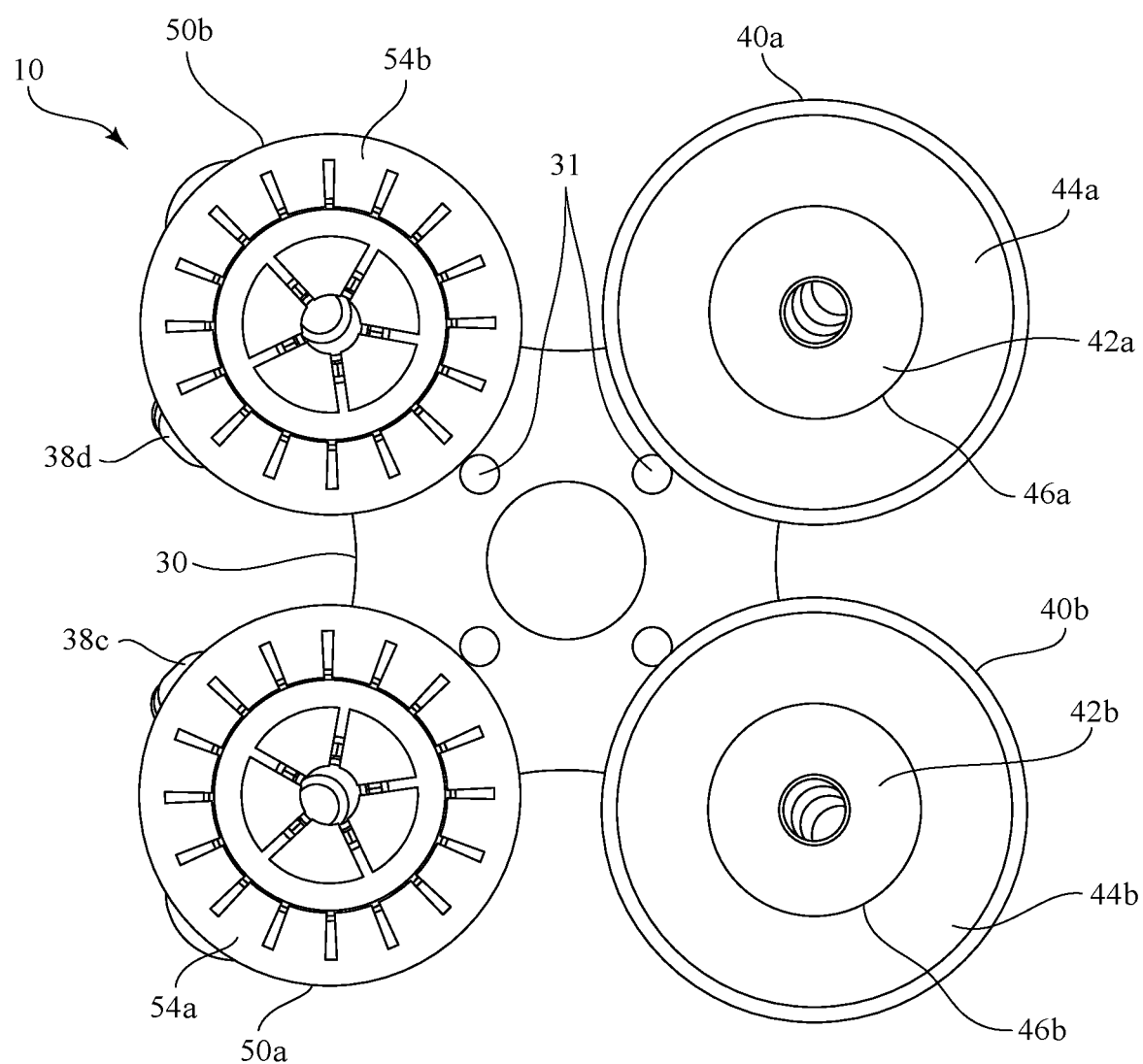
FIG. 3 is a bottom view of the exemplary vacuum-based end effector of FIG. 2.
Figure 4:
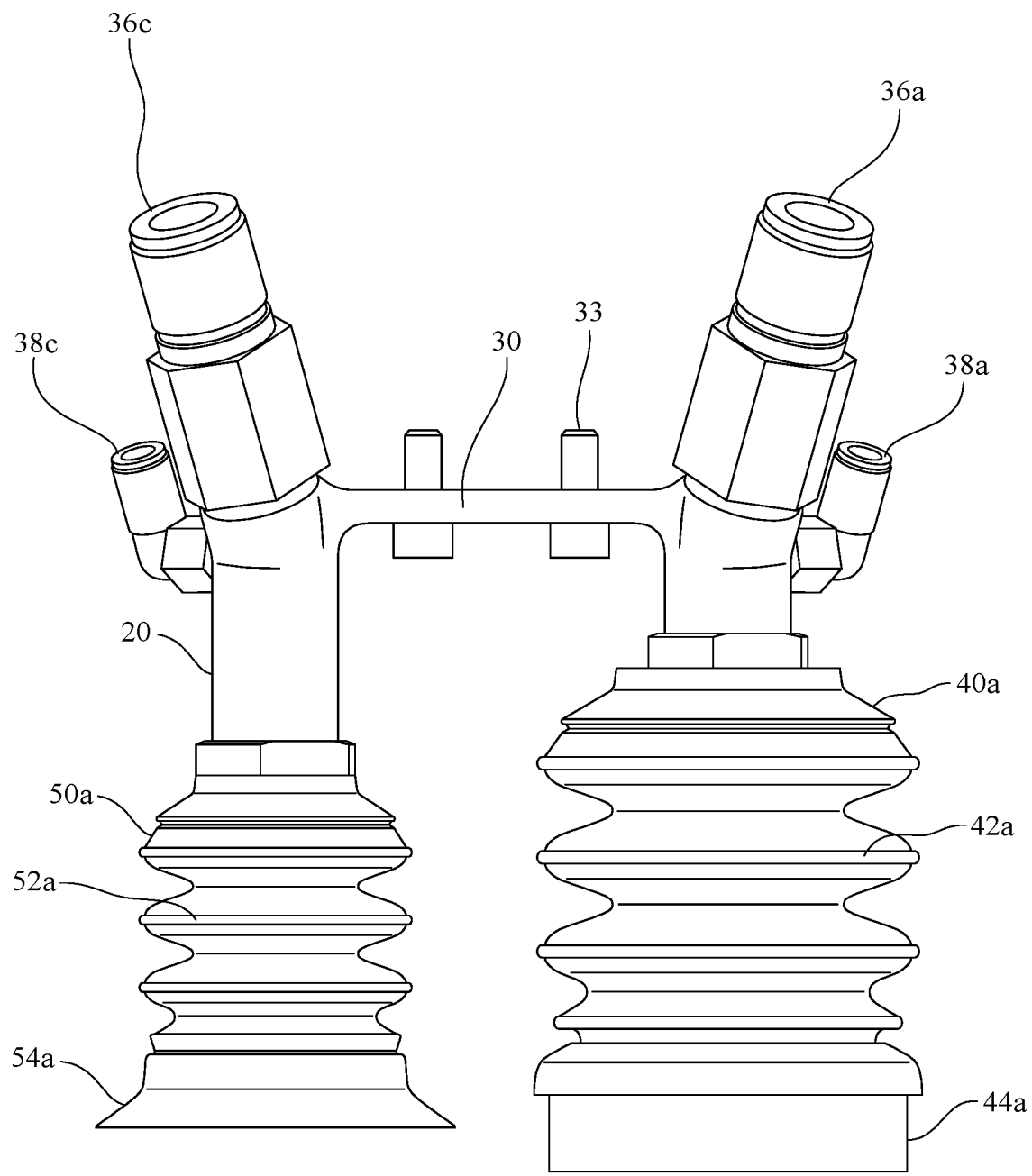
FIG. 4 is a right side view of the exemplary vacuum-based end effector of FIG. 2, and further illustrates a pair of bolts for mounting the vacuum-based end effector.

FIGS. 2-4 are various views of the exemplary end effector 10 of FIG. 1, but with certain components hidden from view to better illustrate features of the end effector 10.

Figure 5:
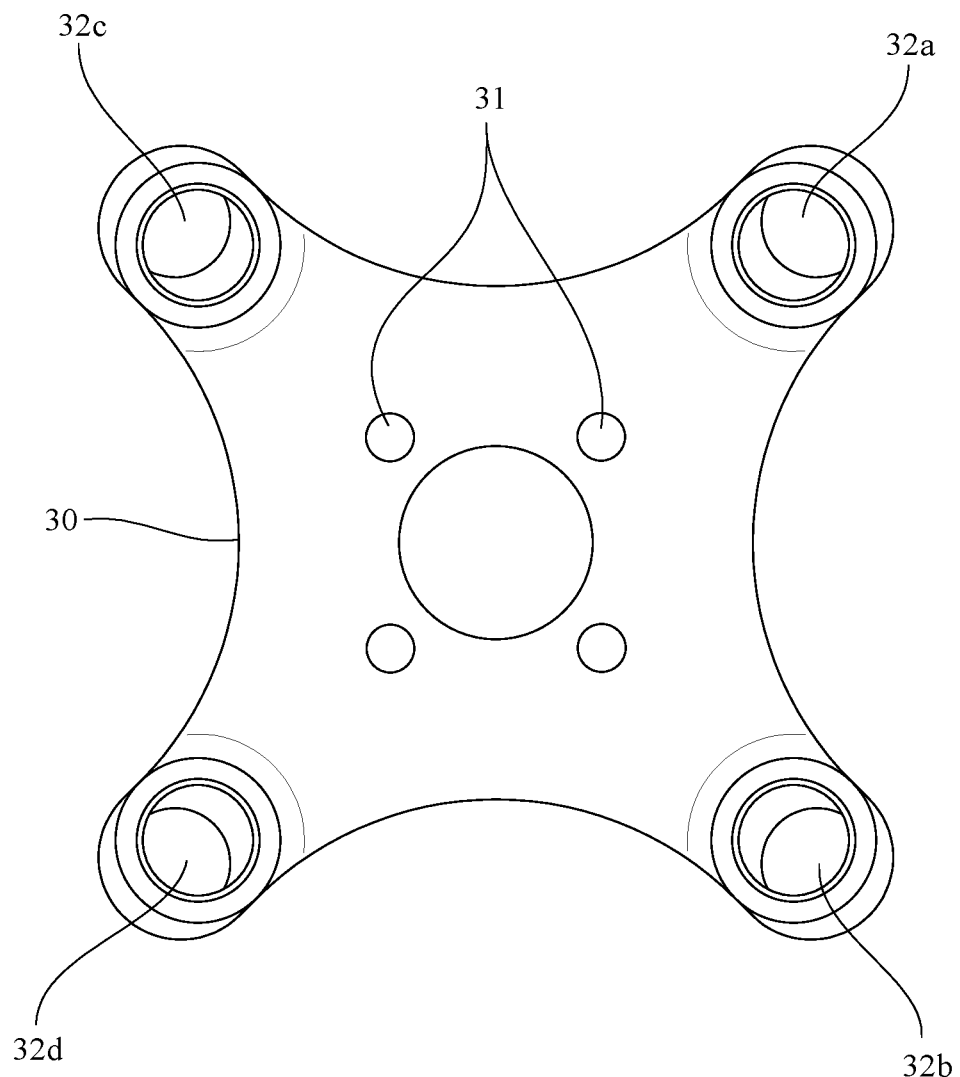
FIG. 5 is a bottom view of the base plate of the exemplary vacuum-based end effector of FIG. 2.

FIG. 5 is bottom view of a single component of the exemplary end effector 10—a base plate 30, the importance of which is further described below.

Referring now to FIGS. 1-5, the exemplary end effector 10 includes a base plate 30 configured for connection to the portion of the robot 12. In this exemplary embodiment, the base plate 30 defines a plurality of openings 31 through which corresponding bolts 33 may pass to bolt the end effector 10 to the portion of the robot 12, although alternative fastening means may, of course, be used without altering the operating principle of the end effector 10.

Referring still to FIGS. 1-5, the end effector 10 further includes one or more vacuum cups 40a, 40b of a first type and one or more vacuum cups 50a, 50b of a second type. In this exemplary embodiment, the end effector 10 includes two vacuum cups 40a, 40b of the first type: a first vacuum cup 40a and a second vacuum cup 40b, which collectively define a first plurality of vacuum cups. Similarly, the end effector 10 includes two vacuum cups 50a, 50b of the second type: a third vacuum cup 50a and a fourth vacuum cup 50b, which collectively define a second plurality of vacuum cups. In other embodiments, however, the end effector 10 may include more than two vacuum cups 40a, 40b, 50a, 50b of the same type (as shown, e.g., by the end effector described 110 below with reference to FIGS. 6-8) or a single vacuum cup of the first type and a single vacuum cup of the second type, while still enabling the end effector 10 to engage target parcels of various shapes, sizes, and construction. The vacuum cups 40a, 40b, 50a, 50b of both the first type and the second type each include a bellows 42a, 42b, 52a, 52b. Each bellows 42a, 42b, 52a, 52b includes a proximal end operatively connected to the base plate 30, such that the bellows 42a, 42b, 52a, 52b are carried by the base plate 30 and can be placed in fluid communication with a vacuum source (not shown). Each bellows 42a, 42b, 52a, 52b also has a distal end to which a lip 44a, 44b, 54a, 54b of each vacuum cup 40a, 40b, 50a, 50b is connected. Air thus flows through each bellows 42a, 42b, 52a, 52b as a vacuum is drawn through each vacuum cup 40a, 40b, 50a, 50b, entering an inlet at the distal end, flowing through the hollow interior, and exiting at an outlet at the proximal end. Each bellows 42a, 42b, 52a, 52b is preferably constructed of a pliable material, which enables the bellows 42a, 42b, 52a, 52b to deform in response to the application of pressure to permit each vacuum cup 40a, 40b, 50a, 50b to sufficiently engage a target parcel. For example, in certain embodiments, each bellows 42a, 42b, 52a, 52b is constructed of a molded thermoplastic, such as thermoplastic polyurethane (TPU). The pliability of the bellows 42a, 42b, 52a, 52b enables the vacuum cups 40a, 40b, 50a, 50b to compress, and thus reduce the force imposed on a target parcel, in instances where the vacuum cups 40a, 40b, 50a, 50b are abruptly lowered down against a surface of the target parcel.

Referring now to FIGS. 1-4, the lip 44a, 44b of each vacuum cup 40a, 40b of the first type is in the form of a foam lip 44a, 44b. The foam lip 44a, 44b of each vacuum cup 40a, 40b of the first type is in the shape of an annulus, with an outer diameter coextensive with the perimeter of the distal end of the bellows 42a, 42b to which the lip 44a, 44b corresponds. In this exemplary embodiment, each foam lip 44a, 44b has an outer diameter of about 70 mm, though the sizing of each foam lip 44a, 44b may, of course, be adjusted to accommodate bellows 42a, 42b of different sizes or as needed for different applications. Each foam lip 44a, 44b is comprised of a foam material of sufficient porosity to allow each of the foam lips 44a, 44b of the vacuum cups 40a, 40b of the first type to be sufficiently compliant when placed in contact with a target parcel (i.e., the foam lip can readily deform in response to the application of pressure and conform to the dimensions of the parcel). In this regard, and without wishing to be bound by any particular theory, it is believed that the foam lips 44a, 44b of the vacuum cups 40a, 40b of the first type are particularly useful in engaging parcels in flexible packaging materials, such as plastic ("poly") bags, that may include a wrinkled or non-uniform surface. In this exemplary embodiment, each foam lip 44a, 44b is composed of a foam rubber, such as ethylene propylene diene monomer (EPDM), with a porosity of approximately 30%. Of course, the particular porosity and rigidity, as well as the material of which the foam lip 44a, 44b of each vacuum cup 40a, 40b of the first type is composed, can be adjusted as needed for a particular application. As shown best in FIG. 3, the foam lip 44a, 44b of each vacuum cup 40a, 40b, of the first type also defines a central channel 46a, 46b that defines a pathway for the flow of air and is also of sufficient diameter as to permit a portion of the flexible packaging material of a parcel to be drawn therein to further assist such cups 40a, 40b in grasping a target parcel.

Referring still to FIGS. 1-4, the lip 54a, 54b of each vacuum cup 50a, 50b of the second type is in the form of an elastomeric lip. The elastomeric lip 54a, 54b of each vacuum cup 50a, 50b of the second type also extends around the perimeter of the bellows 52a, 52b to which the lip 54a, 54b corresponds. In this exemplary embodiment, each elastomeric lip 54a, 54b has an outer diameter of about 63 mm, though the sizing of each elastomeric lip 54a, 54b may, of course, be adjusted to accommodate bellows 52a, 52b of different sizes or as needed for different applications. Furthermore, in this exemplary embodiment, each elastomeric lip 54a, 54b has integral radial ridges, which increase the rigidity of the lips 54a, 54b. In any event, unlike the foam lips 44a, 44b of the vacuum cups 40a, 40b of the first type, each elastomeric lip 54a, 54b is comprised of an elastomeric material which is less compliant than the foam material from which the foam lips 44a, 44b of the vacuum cups 40a, 40b of the first type are constructed. In this regard, and again without wishing to be bound by any particular theory, it is believed that, while versatile, the elastomeric lips 54a, 54b of the vacuum cups 50a, 50b of the second type are particularly useful for engaging parcels made of dull or glossy paper-based materials, such as rigid cardboard and taut plastic (e.g., taut "poly" bag surfaces), as the elastomeric lips 54a, 54b of the vacuum cups 50a, 50b of the second type are capable of attaching and forming a seal with those materials. In this exemplary embodiment, each elastomeric lip 54a, 54b is composed of silicone. Of course, it is contemplated that the elastomeric lips 54a, 54b could, in alternative embodiments, be composed of various other elastomeric materials and still permit the vacuum cups 50a, 50b of the second type to sufficiently engage parcels composed of dull or glossy paper-based materials.

Referring still to FIGS. 1-4, to enable the end effector 10 to grasp target parcels, each vacuum cup 40a, 40b, 50a, 50b connected to the base plate 30 can be placed in fluid communication with a vacuum source (not shown) via a vacuum hose (not shown) to provide suction thereto (i.e., draw air past the respective lip 44a, 44b, 54a, 54b and into the corresponding bellows 42a, 42b, 52a, 52b). To this end, the end effector 10 includes a plurality of connectors 36a, 36b, 36c, 36d corresponding to the vacuum cups 40a, 40b, 50a, 50b. In this exemplary embodiment, the end effector 10 thus includes: a first connector 36a corresponding to the first vacuum cup 40a; a second connector 36b corresponding to the second vacuum cup 40b; a third connector 36c corresponding to the third vacuum cup 50a; and a fourth connector 36d corresponding to the fourth vacuum cup 50b. Each connector 36a, 36b, 36c, 36d is in fluid communication with the bellows 42a, 42b, 52a, 52b of the respective vacuum cup 40a, 40b, 50a, 52a to which it corresponds and is configured to connect to a vacuum hose. Thus, each connector 36a, 36b, 36c, 36d can be selectively connected to or disconnected from a vacuum source to independently turn on or off, and thus individually address, the vacuum cups 40a, 40b, 50a, 50b. In this embodiment each connector 36a, 36b, 36c, 36d is a push connector, though other connector types suitable for connecting to a vacuum hose may alternatively be used without changing the operating principle of the end effector 10 or system as a whole.

Referring again to FIGS. 1-5, the first connector 36a, the second connector 36b, the third connector 36c, and the fourth connector 36d are each in fluid communication with the bellows 42a, 42b, 52a, 52b of the first vacuum cup 40a, the second vacuum cup 40b, the third vacuum cup 50a, and the fourth vacuum cup 50b via the base plate 30. In this regard, in this exemplary embodiment, the base plate 30 defines a plurality of ports 32a, 32b, 32c, 32d, as shown best in FIG. 5, which can be used to interconnect the vacuum cups 40a, 40b, 50a, 50b with the connectors 36a, 36b, 36c, 36d to which they correspond. In this embodiment, the base plate 30 defines: a first port 32a, to which the bellows 42a of the first vacuum cup 40a and the first connector 36a are each connected; a second port 32b, to which the bellows 42b of the second vacuum cup 40b and the second connector 36b are each connected; a third port 32c, to which the bellows 52a of the third vacuum cup 50a are each connected; and a fourth port 32d, to which the bellows 52b of the fourth vacuum cup 50b and the fourth connector 36d are each connected. In this way, the respective ports 32a, 32b, 32c, 32d defined by the base plate 30 serve to place the vacuum cups 40a, 40b, 50a, 50b and their corresponding connectors 36a, 36b, 36c, 36d in fluid communication with each other. Accordingly, in this exemplary embodiment, the bellows 42a, 42b, 52a, 52b of each vacuum cup 40a, 40b, 50a, 50b is directly connected to the base plate 30.

As a further refinement, in some embodiments, the end effector 10 further includes at least one of a vacuum sensor (s) 160, a first proximity sensor 162, and a second proximity sensor 164, which are not shown in FIGS. 1-5, but are described below with reference to FIGS. 6-9.

Figure 6:
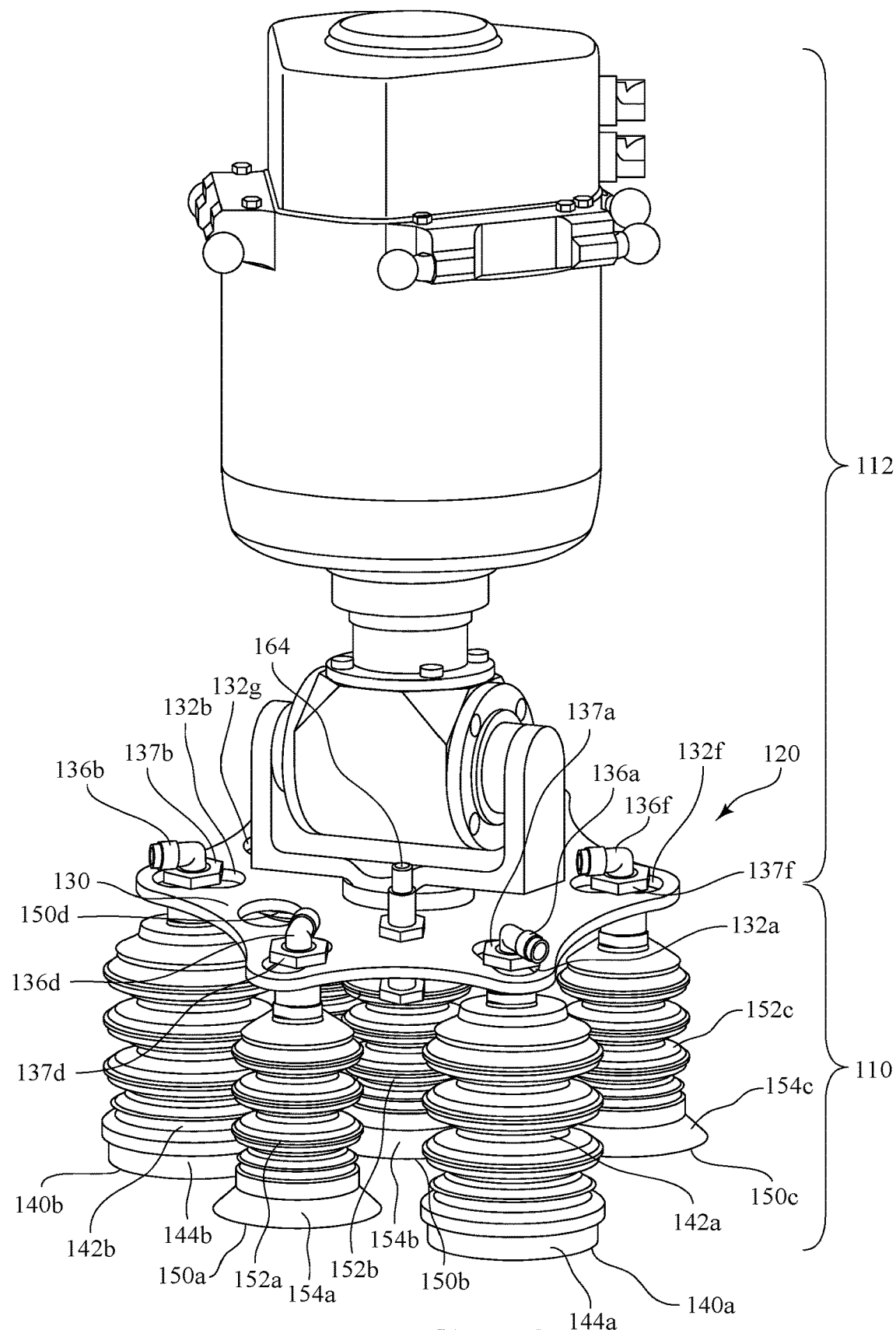
FIG. 6 is a perspective view of another exemplary vacuum-based end effector made in accordance with the present invention mounted to a portion of a robot.

FIG. 6 is a perspective view of another exemplary vacuum-based end effector 110 (or end effector 110) for engaging parcels made in accordance with the present invention. The end effector 110 is configured for mounting to a portion of a robot 112. It should be appreciated that the portion of a robot 112 shown may be a component, such as a robotic arm, of a larger robot or robotic system, which is configured to move the end effector 110 to selectively engage parcels. For example, the portion of the robot 112 may be a component of a Delta P6 robot manufactured by Schneider Electric and available, for instance, from Advantage Industrial Automation of Duluth, Ga. As further discussed below with reference to FIG. 9, movement of such a robot can be, in some embodiments, regulated, at least in part, by a control subsystem to which the robot is operably connected.

Figure 7:
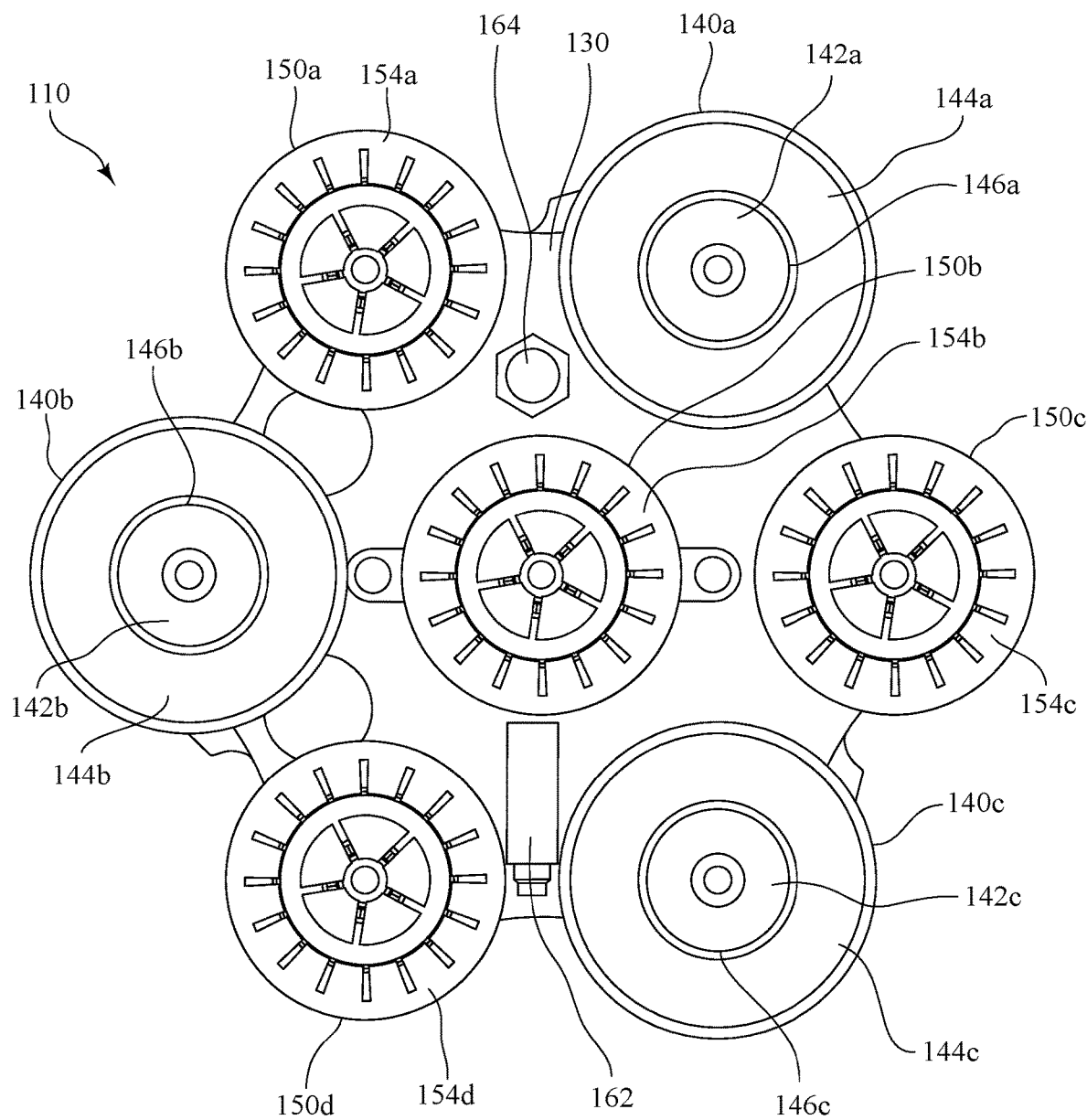
FIG. 7 is a bottom view of the exemplary vacuum-based end effector of FIG. 6, with the portion of the robot and certain components of the exemplary vacuum-based end effector hidden from view for clarity.
Figure 8:
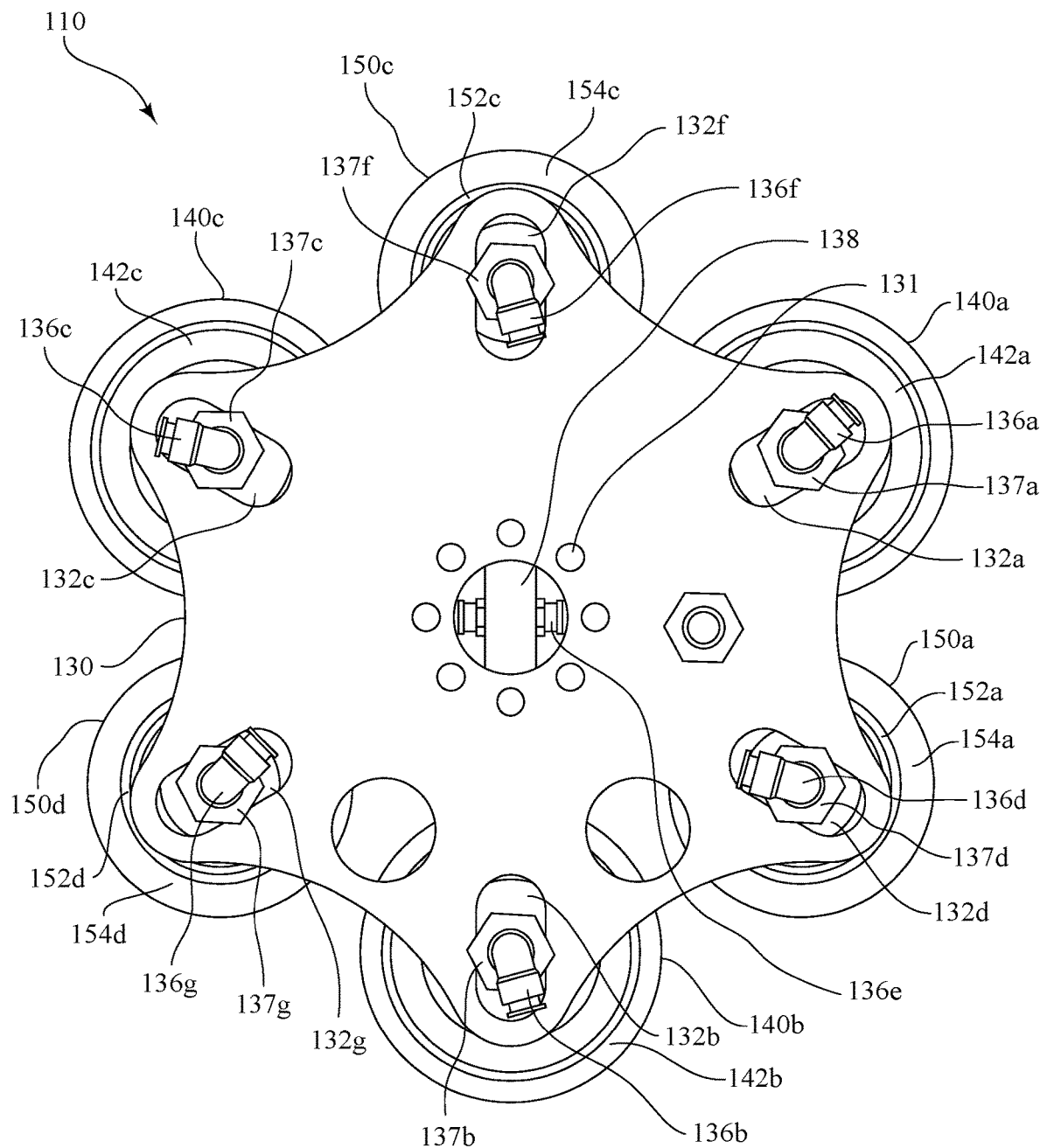
FIG. 8 is a top view of the exemplary vacuum-based end effector of FIG. 7.

FIGS. 7 and 8 are, respectively, bottom and top views of the exemplary end effector 110 shown in FIG. 6, but with certain components hidden from view to better illustrate features of the end effector 10.

Referring now to FIGS. 6-8, the exemplary end effector 110 includes a base plate 130 configured for connection to the portion of the robot 112. In this exemplary embodiment, the base plate 130 defines a plurality of openings 131 through which corresponding bolts (not shown) may pass to bolt the end effector 110 to the portion of the robot 112, though alternative fastening means may, of course, be used without altering the operating principle of the end effector 110.

Referring still to FIGS. 6-8, the end effector 110 further includes one or more vacuum cups 140a, 140b, 140c of a first type and one or more vacuum cups 150a, 150b, 150c, 150d of a second type. In this exemplary embodiment, the end effector 110 includes three vacuum cups 140a, 140b, 140c of the first type: a first vacuum cup 140a; a second vacuum cup 140b, and a third vacuum cup 140c, which collectively define a first plurality of vacuum cups. Furthermore, in this exemplary embodiment, the end effector 110 includes four vacuum cups 150a, 150b, 150c, 150d of the second type: a fourth vacuum cup 150a, a fifth vacuum cup 150b, a sixth vacuum cup 150c, and a seventh vacuum cup 150d, which collectively define a second plurality of vacuum cups. In other embodiments, the end effector 110 shown in FIGS. 6-8 can make use of other configurations and include more or fewer than seven vacuum cups (as shown, e.g., by the end effector 10 described above with reference to FIGS. 1-5). Indeed, embodiments are contemplated wherein the end effector 110 includes only a single vacuum cup 140a, 140b, 140c of the first type and a single vacuum cup 150a, 150b, 150c, 150d of the second type. The vacuum cups 140a, 140b, 140c, 150a, 150b, 150c, 150d of both the first type and the second type each include a bellows 142a, 142b, 142c, 152a, 152b, 152c, 152d. Each bellows 142a, 142b, 142c, 152a, 152b, 152c, 152d has a proximal end operatively connected to the base plate 130, such that each bellows 142a, 142b, 142c, 152a, 152b, 152c, 152d is carried by the base plate 130 and can be placed in fluid communication with a vacuum source (not shown). Each bellows 142a, 142b, 142c, 152a, 152b, 152c, 152d also has a distal end to which a lip 144a, 144b, 144c, 154a, 154b, 154c, 154d of each vacuum cup 140a, 140b, 140c, 150a, 150b, 150c, 150d is connected. Each bellows 142a, 142b, 142c, 152a, 152b, 152c, 152d is preferably constructed of a pliable material, which enables the bellows 142a, 142b, 142c, 152a, 152b, 152c, 152d to deform in response to the application of pressure to permit each vacuum cup 140a, 140b, 140c, 150a, 150b, 150c, 150d to sufficiently engage a target parcel. For example, in certain embodiments, each bellows 142a, 142b, 142c, 152a, 152b, 152c, 152d is constructed of a molded thermoplastic, such as thermoplastic polyurethane (TPU). The pliability of the bellows 142a, 142b, 142c, 152a, 152b, 152c, 152d enables the vacuum cups 140a, 140b, 140c, 150a, 150b, 150c, 150d to compress, and thus reduce the force imposed on a target parcel, in instances where the vacuum cups 140a, 140b, 140c, 150a, 150b, 150c, 150d are abruptly lowered down against a surface of the target parcel.

As best shown in FIGS. 6 and 7, the lip 144a, 144b, 144c of each vacuum cup 140a, 140b, 140c of the first type is in the form of a foam lip 144a, 144b, 144c. The foam lip 144a, 144b, 144c of each vacuum cup 140a, 140b, 140c of the first type extends around the perimeter of the distal end of the bellows 142a, 142b, 142c to which the lip 144a, 144b, 144c corresponds. In this exemplary embodiment, each foam lip 144a, 144b, 144c has a diameter of about 70 mm, though the sizing of each foam lip 144a, 144b, 144c may, of course, be adjusted to accommodate bellows 142a, 142b, 142c of different sizes or as needed for different applications. Each foam lip 144a, 144b, 144c is comprised of a foam material of sufficient porosity to allow each of the foam lips 144a, 144b, 144c of the vacuum cups 140a, 140b, 140c of the first type to be sufficiently compliant when placed in contact with a target parcel (i.e., the foam lip can readily deform in response to the application of pressure and conform to the dimensions of the parcel). In this regard, without wishing to be bound by any particular theory, it is believed that the foam lips 144a, 144b, 144c of the vacuum cups 140a, 140b, 140c of the first type are particularly useful in engaging parcels in flexible packaging materials, such as plastic ("poly") bags, that may include a wrinkled or non-uniform surface. In this exemplary embodiment, each foam lip 144a, 144b, 144c is composed of a foam rubber, such as ethylene propylene diene monomer (EPDM), with a porosity of approximately 30%. Of course, the particular porosity and rigidity, as well as the material of which the foam lip 144a, 144b, 144c of each vacuum cup 140a, 140b, 140c of the first type is composed, can be adjusted as needed for a particular application. As best shown in FIG. 7, the foam lip 144a, 144b, 144c of each vacuum cup 140a, 140b, 140c of the first type also defines a central channel 146a, 146b, 146c that defines a pathway for the flow of air and is also of sufficient diameter as to permit a portion of the flexible packaging material of a parcel to be drawn therein to further assist such cups 140a, 140b, 140c in grasping a target parcel.

Referring now to FIGS. 6-8, the lip 154a, 154b, 154c, 154d of each vacuum cup 150a, 150b, 150c, 150d of the second type is in the form of an elastomeric lip. The elastomeric lip 154a, 154b, 154c, 154d of each vacuum cup 150a, 150b, 150c, 150d of the second type also extends around the perimeter of the bellows 152a, 152b, 152c, 152d to which the lip 154a, 154b, 154c, 154d corresponds. In this exemplary embodiment, each elastomeric lip 154a, 154b, 154c, 154d has a diameter of about 63 mm, though the sizing of each elastomeric lip 154a, 154b, 154c, 154d may, of course, be adjusted to accommodate bellows 152a, 152b, 152c, 152d of different sizes or as needed for different applications. Unlike the foam lips 144a, 144b, 144c of the vacuum cups 140a, 140b, 140c of the first type, each elastomeric lip 154a, 154b, 154c, 154d is comprised of an elastomeric material which is less compliant than the foam material from which the foam lips 144a, 144b, 144c of the vacuum cups 140a, 140b, 140c of the first type are constructed. In this regard, and again without wishing to be bound by any particular theory, it is believed that, while versatile, the elastomeric lips 154a, 154b, 154c, 154d of the vacuum cups 150a, 150b, 150c, 150d of the second type are particularly useful for engaging parcels including dull or glossy paper-based materials, such as rigid cardboard and taut plastic, such as taut polybag surfaces, as the elastomeric lips 154a, 154b, 154c, 154d of the vacuum cups 150a, 150b, 150c, 150d of the second type are capable of attaching and forming a seal with those materials. In this exemplary embodiment, each elastomeric lip 154a, 154b, 154c, 154d is composed of silicone. Of course, it is contemplated that the elastomeric lips 154a, 154b, 154c, 154d could, in alternative embodiments, be composed of various other elastomeric materials and still permit the vacuum cups 150a, 150b, 150c, 150d of the second type to sufficiently engage parcels made of dull or glossy paper-based materials.

Referring now to FIG. 7, to further increase the ability of the end effector 110 to effectively engage parcels of various dimension and construction, the vacuum cups 140a, 140b, 140c of the first type and the vacuum cups 150a, 150b, 150c, 150d of the second type can be connected to the base plate 130, such that vacuum cups 140a, 140b, 140c of the first type and vacuum cups 150a, 150b, 150c, 150d of the second type are arranged in an alternating configuration. In this exemplary embodiment, the first vacuum cup 140a, the second vacuum cup 140b, the third vacuum cup 140c, the fourth vacuum cup 150a, the sixth vacuum cup 150c, and the seventh vacuum cup 150d are arranged in alternating configuration around the perimeter of the base plate 130. In this way, when the end effector 110 is attached to the portion of the robot 12, and the end effector 110 is manipulated thereby to be placed on a tilted axis, the vacuum cups 140a, 140b, 140c, 150a, 150b, 150c, 150d are oriented such that the lowest point of the end effector 110 (i.e., the point in closest proximity to a parcel) includes at least one of the vacuum cups 140a, 140b, 140c of the first type and at least one of the vacuum cups 150a, 150b, 150c, 150d of the second type. Furthermore, to provide a surface suitable for engaging parcels between the opposing vacuum cups 140a, 140b, 140c, 150a, 150b, 150c, 150d arranged around the perimeter of the base plate 130, either a vacuum cup 140a, 140b, 140c of the first type or a vacuum cup 150a, 150b, 150c, 150d of the second type is connected to a center area of the base plate 130. In this exemplary embodiment, the fifth vacuum cup 150b is connected to the center of the base plate 130. By arranging the vacuum cups 140a, 140b, 140c, 150a, 150b, 150c, 150d in the foregoing configuration, when the end effector 110 is being used with a varied mix of parcels (e.g., including those parcels in both flexible plastic bags and rigid cardboard boxes), the chance of contact between a particular parcel and the preferred type of vacuum cup 140a, 140b, 140c, 150a, 150b, 150c, 150d for that parcel is maximized. Moreover, by arranging the vacuum cups 140a, 140b, 140c, 150a, 150b, 150c, 150d in such a configuration, the individual vacuum cups 140a, 140b, 140c of the first type and the individual vacuum cups 150a, 150b, 150c, 150d of the second type are spaced at a distance from one another, such that the distance between similar vacuum cups provides added stability when grasping or otherwise manipulating a particular parcel.

Referring now to FIGS. 6 and 8, to enable the end effector 110 to grasp target parcels, each vacuum cup 140a, 140b, 140c, 150a, 150b, 150c, 150d connected to the base plate 130 can be placed in fluid communication with a vacuum source (not shown) via a vacuum hose (not shown) to provide suction thereto (i.e., draw air past the lip 144a, 144b, 144c, 154a, 154b, 154c, 154d and into the corresponding bellows 142a, 42b, 142c, 152a, 52b, 152c, 152d). To this end, the end effector 110 further includes a plurality of connectors 136a, 136b, 136c, 136d, 136e, 136f, 136g corresponding to the vacuum cups 140a, 140b, 140c, 150a, 150b, 150c, 150d. In this exemplary embodiment, the end effector 110 thus includes: a first connector 136a corresponding to the first vacuum cup 140a; a second connector 136b corresponding to the second vacuum cup 140b; a third connector 136c corresponding to the third vacuum cup 140c; a fourth connector 136d corresponding to the fourth vacuum cup 150a; a fifth connector 136e corresponding to the fifth vacuum cup 150b; a sixth connector 136f corresponding to the sixth vacuum cup 150c; and a seventh connector 136g corresponding to the seventh vacuum cup 150d. Each connector 136a, 136b, 136c, 136d, 136e, 136f, 136g is in fluid communication with the bellows 142a, 142b, 142c, 152a, 152b, 152c, 152d of the respective vacuum cup 140a, 140b, 140c, 150a, 150b, 150c, 150d to which it corresponds and is configured to connect to a vacuum hose. Thus, each connector 136a, 136b, 136c, 136d, 136e, 136f, 136g can be selectively connected to or disconnected from a vacuum source to independently turn on or off, and thus individually address, the vacuum cups 140a, 140b, 140c, 150a, 150b, 150c, 150d. In this embodiment each connector 136a, 136b, 136c, 136d, 136e, 136f, 136g is a push connector, though other connector types suitable for connecting to a vacuum hose may alternatively be used without changing the operating principle of the end effector 110 or system as a whole.

Referring still to FIGS. 6 and 8, each connector 136a, 136b, 136c, 136d, 136e, 136f, 136g is directly connected to, and thus in direct fluid communication with, the bellows 142a, 142b, 142c, 152a, 152b, 152c, 152d of the vacuum cups 140a, 140b, 140c, 150a, 150b, 150c, 150d to which it corresponds. In this regard, in this exemplary embodiment, the base plate 130 defines a plurality of slots 132a, 132b, 132c, 132d, 132f, 132g that permit the connectors 136a, 136b, 136c, 136d, 136f, 136g corresponding to the vacuum cups 140a, 140b, 140c, 150a, 150c, 150d arranged around the perimeter of the base plate 130 to extend through the base plate 130 and connect to the proximal end of bellows 142a, 142b, 142c, 152a, 152c, 152d of such vacuum caps 140a, 140b, 140c, 150a, 150c, 150d. To prevent the first connector 136a, the second connector 136b, the third connector 136c, the fourth connector 136d, the sixth connector 136f, and the seventh connector 136g from slipping through the respective slots 132a, 132b, 132c, 132d, 132f, 132g, each of the foregoing connectors 136a, 136b, 136c, 136d, 136f, 136g includes a portion having a width which is greater than that of the slot 132a, 132b, 132c, 132d, 132f, 132g through which it extends. In this exemplary embodiment, the first connector 136a, the second connector 136b, the third connector 136c, the fourth connector 136d, the sixth connector 136f, and the seventh connector 136g each include a nut 137a, 137b, 137c, 137d, 137f, 137g of a greater width than the slot 132a, 132b, 132c, 132d, 132f, 132g through which the respective connectors 136a, 136b, 136c, 136d, 136f, 136g extend. The fifth connector 136e corresponding to the fifth vacuum cup 150b is connected to a bracket 138, which, in turn, is connected to the base plate 130. Thus, in this exemplary embodiment, the proximal end of the bellows 142a, 142b, 142c, 152a, 152b, 152c, 152d of each vacuum cup 140a, 140b, 140c, 150a, 150b, 150c, 150d is indirectly connected to the base plate 130.

In addition to facilitating direct connection between the vacuum cups 140a, 140b, 140c, 150a, 150c, 150d arranged around the perimeter of the base plate 130 and their corresponding connectors 136a, 136b, 136c, 136d, 136f, 136g, the slots 132a, 132b, 132c, 132d, 132f, 132g defined by the base plate 130 also permits the spacing between the vacuum cups 140a, 140b, 140c, 150a, 150b, 150c, 150d to be adjusted. As perhaps shown best in FIG. 8, the slots 132a, 132b, 132c, 132d, 132f, 132g are elongated and extend towards the center of the base plate 130. As such, the connectors 136a, 136b, 136c, 136d, 136f, 136g corresponding to the vacuum cups 140a, 140b, 140c 150a, 150c, 150d arranged around the perimeter of the base plate 130 can be moved along the slot 132a, 132b, 132c, 132d, 132f, 132g through which they extend either toward the center of the base plate 130 to decrease the spacing between the vacuum cups 140a, 140b, 140c, 150a, 150b, 150c, 150d or toward the perimeter of the base plate 130 to increase the spacing between the vacuum cups 140a, 140b, 140c, 150a, 150b, 150c, 150d. In some embodiments, the nut 137a, 137b, 137c, 137d, 137f, 137g corresponding to the connectors 136a, 136b, 136c, 136d, 136f, 136g can be tightened to secure the vacuum cups 140a, 140b, 140c, 150a, 150c, 150d arranged around the perimeter of the base plate 130 in a fixed position or loosened to permit movement thereof.

Referring now to FIGS. 6-9, to detect the proximity of parcels relative to the end effector 110 or to detect pneumatic engagement of the end effector 110 with a parcel, the end effector 110 may include one or more sensors. Specifically, in this exemplary embodiment, the end effector 110 includes one or more vacuum sensors 160, along with a first proximity sensor 162 and a second proximity sensor 164. Each of the one or more vacuum sensors 160 is operably connected to one or more of the vacuum cups 140a, 140b, 140c, 150a, 150b, 150c, 150d and is configured to provide vacuum pressure feedback indicative of whether the vacuum cups 140a, 140b, 140c, 150a, 150b, 150c, 150d to which the vacuum sensor 160 is operably connected has pneumatically engaged with a parcel. In this regard, it is preferred that each vacuum cup 140a, 140b, 140c, 150a, 150b, 150c, 150d has a corresponding vacuum sensor 160 (i.e., one sensor per vacuum cup), such that vacuum pressure feedback is provided for each vacuum cup 140a, 140b, 140c, 150a, 150b, 150c, 150d, thus permitting the pneumatic engagement of each vacuum cup 140a, 140b, 140c, 150a, 150b, 150c, 150d to be independently assessed.

Referring now to FIGS. 1, 2, and 4, to facilitate connection between the one or more vacuum sensors 160 and the end effector 10, the end effector 10 can, in some embodiments, further include one or more sensor ports 38a, 38b, 38c, 38d, each configured to operably connect a vacuum sensor (such as the vacuum sensor(s) 160 described above with respect to FIG. 9) to a vacuum cup 40a, 40b, 50a, 50b. Specifically, in the exemplary embodiment, shown in FIGS. 1, 2, and 4, the end effector 10 includes a sensor port 38a, 38b, 38c, 38d corresponding to each vacuum cup 40a, 40b, 40c, 40d. In other words, the end effector 10 includes four sensor ports 38a, 38b, 38c, 38d: a first sensor port 38a corresponding to the first vacuum cup 40a; a second sensor port 38b corresponding to the second vacuum cup 40b; a third sensor port 38c corresponding to a third vacuum cup 50a; and a fourth sensor port 38d corresponding to a fourth vacuum cup 50b. Each sensor port 38a, 38b, 38c, 38d is in fluid communication with the vacuum cup 40a, 40b, 50a, 50b to which it corresponds. Of course, the exemplary end effector 110 shown in FIGS. 6-8 could similarly be provided with one or more sensor ports to operably connect the vacuum cups 140a, 140b, 140c, 150a, 150b, 150c, 150d to respective vacuum sensors.

Referring now again to FIGS. 6-9, in this exemplary embodiment, the first proximity sensor 162 is a photoelectric proximity sensor configured to emit a beam of visible or infrared light to detect the presence of a parcel. As shown in FIG. 7, the first proximity sensor 162 is attached to a lower surface of the base plate 130 to detect the presence of a parcel positioned below the end effector 110. As shown in FIGS. 6 and 7, the second proximity sensor 164 is attached to and extends through the base plate 130. In this exemplary embodiment, the second proximity sensor 164 is an ultrasonic sensor configured to detect the amount of compression each of the bellows 142a, 142b, 142c, 152a, 152b, 152c, 152d of each of the vacuum cups 140a, 140b, 140c, 150a, 150b, 150c, 150d by sending ultrasonic signals near the base plate 130 downward. As noted above, in some embodiments, the end effector 10 described above in reference to FIGS. 1-4 further includes the one or more vacuum sensors 160 and two proximity sensors 162, 164. In such embodiments, the two proximity sensors 162, 164 are attached to the base plate 30 in similar fashion as that described above with reference to the end effector shown in FIGS. 6-8.

Figure 9:
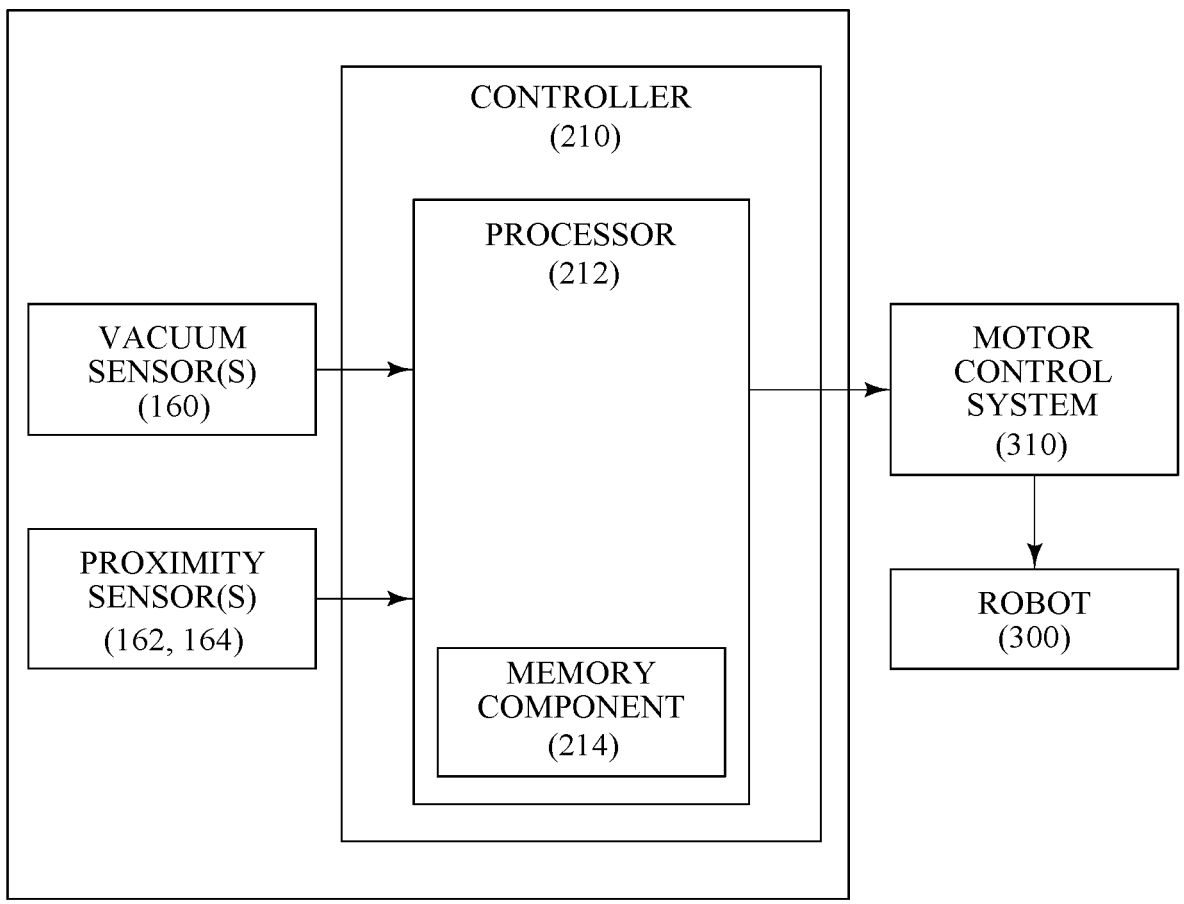
FIG. 9 is a schematic diagram of a control subsystem for a system that includes a vacuum-based end effector made in accordance with the present invention.

FIG. 9 is a schematic diagram of a control subsystem 200, which can be utilized with each of the above-described end effectors 10, 110 to regulate, at least in part, movement of a robot 300 to which the end effector 10, 110 is mounted. As shown in FIG. 9, the control subsystem 200 includes the one or more vacuum sensor(s) 160, the first proximity sensor 162, and the second proximity sensor 164 described above, which collect data regarding proximity of the end effector 10, 110 to a parcel and engagement of the end effector 10, 110 with a parcel. The control subsystem 200 further includes a controller 210 operably connected to the sensors 160, 162, 164, such that data collected by the sensors 160, 162, 164 is transmitted as input to the controller 210 for subsequent processing. The controller 210 includes a processor 212 for executing instructions (routines) stored in a memory component 214 or other computer-readable medium. Data gathered by each sensor 160, 162, 164 can be in the form of a binary signal indicative of whether a particular threshold or condition for the particular sensor 160, 162, 164 has been satisfied, a measured value corresponding to a measurement reading taken by the particular sensor 160, 162, 164 that can be transmitted to the controller 210 and compared against a threshold value to determine whether a particular condition has been met, or a combination thereof. The controller 210, in this exemplary embodiment, is also operably connected to the robot 300 to which the end effector 10, 110 is mounted, such that the controller 210 can communicate instructions which cause the robot 300 to move and reposition the end effector 10, 110 toward a parcel for engagement therewith. In this way, either of the above-described end effectors 10, 110 can be operably connected to a robot 300 to provide an improved system for engaging parcels.

In use, the control subsystem 200 functions to assist the end effector 10, 110 and the robot 300 in locating and engaging parcels in need of transport/sorting, e.g., parcels located on a conveyor at a sorting facility. To this end, the control subsystem 200 may work in conjunction with an existing motor control system 310, such as that described in U.S. Patent Application Publication No. 2018/0345324, which has been incorporated herein by reference, for the robot 300. In this regard, the motor control system 310 controls movement of the robot 300 and the control subsystem 200 is operably connected to the motor control system 310, such that the control subsystem 200 can communicate instructions to the motor control system 310, which ultimately informs the manner in which robot 300 to which the end effector 10, 110 is mounted is moved. In this particular embodiment, the control subsystem 200 is configured to communicate instructions to the motor control system 310 for fine or precise movement of the portion of the robot 300.

In certain implementations that make use of an end effector 10, 110 made in accordance with the present invention to sort parcels on a conveyor, the sorting process is commenced by placing parcels on a conveyor and supplying a vacuum to the respective vacuum cups 40a, 40b, 50a, 50b, 140a, 140b, 140c, 150a, 150b, 150c, 150d of the end effector 10, 110. The end effector 10, 110 is positioned, via movement of the robot 300 to which it is mounted, to the general area in which a parcel is located on the conveyor. To assist the robot 300 in identifying the general area in which a parcel is located, in some embodiments, the control subsystem 200 and/or the motor control system 310 may be further operably connected to a visioning subsystem with one or more cameras, such as that described in U.S. Patent Application Publication No. 2018/0345324, which captures and analyzes two-dimensional and/or three-dimensional image data corresponding to parcel location. Once the end effector 10, 110 is in the general area of a parcel, input from the first proximity sensor 162 and the second proximity sensor 164 assists the motor control system 310 in positioning the robot 300, and thus the end effector 10, 110, in closer proximity the target parcels to facilitate pneumatic engagement of the end effector 10, 110 therewith. When a parcel is in proximity to the end effector 10, 110, the first proximity sensor 162 and the second proximity sensor 164 detect the position of the parcel and transmit data reflecting the same to the controller 210 for subsequent processing. Based on the data received from the first proximity sensor 162 and the second proximity sensor 164, the controller 210 then may communicate further instructions to motor control system 310, which repositions the robot 300 and the end effector 10, 110 mounted thereto toward the parcel. Each vacuum sensor 160 provides data to the controller 210 regarding vacuum pressure indicative of whether the vacuum cups 40a, 40b, 50a, 50b, 140a, 140b, 140c, 150a, 150b, 150c, 150d have pneumatically engaged with the parcel.

In certain implementations, if the first proximity sensor 162 and the second proximity sensor 164 detect that a parcel is near, but the data from the vacuum sensor(s) 160 of the end effector 10, 110 are not indicative of an increased vacuum pressure signifying pneumatic engagement, the controller 210 will determine that the end effector 10, 110 has not pneumatically engaged the parcel. Upon such determination, the controller 210 can subsequently communicate instructions to the motor control system 310 which cause the robot 300 to reposition the end effector 10, 110 closer to the parcel until data is received from the vacuum sensor(s) 160 signifying increased vacuum pressure and, thus, pneumatic engagement with the parcel.

In some implementations, the second proximity sensor 164 has an upper threshold (e.g., a defined duration in which it takes an emitted ultrasonic signal to be returned that corresponds to the height of the vacuum cups 40a, 40b, 50a, 50b, 140a, 140b, 140c, 150a, 150b, 150c, 150d when the bellows 42a, 42b, 52a, 52b, 142a, 142b, 142c, 152a, 152b, 152c, 152d are fully compressed. Prior to the upper threshold of the second proximity sensor 164 being exceeded (i.e., the bellows not being fully compressed), the second proximity sensor 164 may be configured to transmit a first data signal to the controller 210 (e.g., a "True" or "ON" signal) when the parcel is close proximity to the end effector 10, 110, whereas after the upper threshold is exceeded, it may be configured to transmit a second data signal to the controller 210 (e.g., a "False" or "OFF" signal). In such implementations, as the end effector 10, 110 is pressed onto a parcel, the vacuum cups 40a, 40b, 50a, 50b, 140a, 140b, 140c, 150a, 150b, 150c, 150d compress while the controller 210 monitors the vacuum pressure of each vacuum cup 40a, 40b, 50a, 50b, 140a, 140b, 140c, 150a, 150b, 150c, 150d. When the bellows 42a, 42b, 52a, 52b, 142a, 142b, 142c, 152a, 152b, 152c, 152d of the vacuum cups 40a, 40b, 50a, 50b, 140a, 140b, 140c, 150a, 150b, 150c, 150d are fully compressed, the first proximity sensor 162 will transmit data to the controller 210 indicating that a parcel is in proximity to the end effector 10, 110 (e.g., a "True" or "ON" signal), while the second proximity sensor 164 will transmit data to the controller 210 indicating that one or more of the vacuum cups 40a, 40b, 50a, 50b, 140a, 140b, 140c, 150a, 150b, 150c, 150d have made full contact with the parcel (e.g., a "False" or "OFF" signal). In this way, the combination of data from the first proximity sensor 162 and the second proximity sensor 164 may serve to protect the parcel by causing the controller 210 to communicate instructions which prevent robot 300 from further driving the end effector 10, 110 downward on the parcel when the vacuum cups 40a, 40b, 50a, 50b, 140a, 140b, 140c, 150a, 150b, 150c, 150d are fully compressed.

If the data from the vacuum sensor(s) 160 of the end effector 10, 110 is not indicative of a vacuum pressure increase signifying pneumatic engagement, the controller 210 will determine that even though the end effector 10, 110 made full contact with a particular parcel, it nonetheless failed to pneumatically engage a parcel. Upon such determination, the controller 210 can communicate instructions to the motor control system 310 to further reposition the robot 300 and the end effector 10, 110 mounted thereto. Data continues to be transmitted from the sensors 160, 162, 164 and processed by the controller 210, and the controller continues to communicate instructions to the robot 300 to reposition the end effector 10, 110 until one or more of the vacuum cups 40a, 40b, 50a, 50b, 140a, 140b, 140c, 150a, 150b, 150c, 150d successfully pneumatically engages a parcel, as evidenced by the data transmitted from the vacuum sensor(s) 160. In this particular implementation, a parcel is considered to be successfully pneumatically engaged when data from the first proximity sensor 162 indicates the parcel is in close proximity, the threshold of the second proximity sensor 164 is reached indicating that the bellows 42a, 42b, 52a, 52b, 142a, 142b, 142c, 152a, 152b, 152c, 152d of the vacuum cups 40a, 40b, 50a, 50b, 140a, 140b, 140c, 150a, 150b, 150c, 150d are fully compressed, and increased vacuum pressure data indicative of pneumatic engagement is transmitted from the vacuum sensor(s) 160 of the end effector 10, 110. Once the end effector 10, 110 has successfully pneumatically engaged a parcel, the robot 300 can be manipulated to direct the parcel to an intended destination. Upon reaching the intended destination, the one or more vacuum cups 40a, 40b, 50a, 50b, 140a, 140b, 140c, 150a, 150b, 150c, 150d carrying the parcel can be disconnected from the vacuum source to cease suction and release the parcel in the intended destination.

As a further refinement, in some implementations, force feedback from a load cell (not shown) or current feedback in a servo drive mechanism articulating the end effector 10, 110 can also be measured so as to provide an estimation of force resistance to ascertain whether a parcel has been effectively engaged or manipulated.

One of ordinary skill in the art will recognize that additional embodiments and implementations are also possible without departing from the teachings of the present invention. This detailed description, and particularly the specific details of the embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A vacuum-based end effector, comprising:
   a base plate;
   one or more vacuum cups of a first type connected to the base plate and configured to be placed in fluid communication with a vacuum source, each vacuum cup of the one or more vacuum cups of the first type including
      a bellows defining a pathway for a flow of air, the bellows having a proximal end operably connected to the base plate and a distal end, and
      a foam lip connected to the distal end of the bellows; and
   one or more vacuum cups of a second type connected to the base plate and configured to be placed in fluid communication with the vacuum source, each vacuum cup of the one or more vacuum cups of the second type including
      a bellows defining a pathway for a flow of air, the bellows having a proximal end operably connected to the base plate and a distal end, and
      an elastomeric lip connected to the distal end of the bellows.

2. The vacuum-based end effector as recited in claim 1, wherein the foam lip is comprised of a foam rubber.

3. The vacuum-based end effector as recited in claim 1, wherein the elastomeric lip is comprised of silicone.

4. The vacuum-based end effector as recited in claim 1, and further comprising:
   a vacuum sensor operably connected to at least one vacuum cup.

5. The vacuum-based end effector as recited in claim 1, and further comprising:
   one or more proximity sensors, each of the one or more proximity sensors being configured to detect the presence of a parcel relative to the vacuum-based end effector.

6. The vacuum-based end effector as recited in claim 5, wherein the one or more proximity sensors comprises at least one photoelectric sensor.

7. The vacuum-based end effector as recited in claim 5, wherein the one or more proximity sensors comprises at least one ultrasonic sensor, the at least one ultrasonic sensor being configured to detect an amount of compression of at least one vacuum cup.

8. The vacuum-based end effector as recited in claim 1, wherein the one or more vacuum cups of the first type and the one or more vacuum cups of the second type are adjustably connected to the base plate.

9. The vacuum-based end effector as recited in claim 1, wherein the one or more vacuum cups of the first type comprises a first plurality of vacuum cups, and wherein the one or more vacuum cups of the second type comprises a second plurality of vacuum cups.

10. The vacuum-based end effector as recited in claim 9, wherein the first plurality of vacuum cups and the second plurality of vacuum cups are arranged in an alternating configuration around a perimeter of the base plate.

11. The vacuum-based end effector as recited in claim 9, wherein at least one of the first plurality of vacuum cups and the second plurality of vacuum cups includes a vacuum cup connected to a center area of the base plate.

12. The vacuum-based end effector as recited in claim 9, and further comprising:
multiple vacuum sensors, with each vacuum cup of the first plurality of vacuum cups and each vacuum cup of the second plurality of vacuum cups being operably connected to one of the multiple vacuum sensors.

13. A system for engaging parcels, comprising:
a robot; and
an end effector operably connected to the robot, the end effector including
a base plate,
one or more vacuum cups of a first type connected to the base plate and configured to be placed in fluid communication with a vacuum source, each vacuum cup of the one or more vacuum cups of the first type including
a bellows defining a pathway for a flow of air, the bellows having a proximal end operably connected to the base plate and a distal end, and
a foam lip connected to the distal end of the bellows, and
one or more vacuum cups of a second type connected to the base plate and configured to be placed in fluid communication with the vacuum source, each vacuum cup of the one or more vacuum cups of the second type including
a bellows defining a pathway for a flow of air, the bellows having a proximal end operably connected to the base plate and a distal end, and
an elastomeric lip connected to the distal end of the bellows.

14. The system for engaging parcels as recited in claim 13, and further comprising:
one or more sensors; and
a controller operably connected to each sensor of the one or more sensors and the robot, the controller including a processor for executing instructions stored in a memory component to (i) receive and analyze data received from the one or more sensors to locate a parcel, and (ii) communicate instructions to the robot which causes the robot to move the end effector toward the parcel.

15. The system for engaging parcels as recited in claim 14, wherein each sensor of the one or more sensors is configured to acquire data corresponding to at least one of positioning of the parcel, pneumatic engagement with the parcel, and an amount of vacuum cup compression.

16. A system for engaging parcels, comprising:
a robot; and
an end effector operably connected to the robot, the end effector including
a base plate,
one or more vacuum cups connected to the base plate and configured to be placed in fluid communication with a vacuum source,
one or more vacuum sensors, each vacuum cup of the one or more vacuum cups being operably connected to a vacuum sensor of the one or more vacuum sensors,
a photoelectric sensor attached to the base plate, the photoelectric sensor being configured to detect the presence of a parcel relative to the end effector, and
an ultrasonic sensor attached to the base plate, the ultrasonic sensor being configured to detect an amount of compression of at least one vacuum cup of the one or more vacuum cups.

17. The system for engaging parcels as recited in claim 16, and further comprising:
a controller operably connected to each of the one or more vacuum sensors, the photoelectric sensor, the ultrasonic sensor, and the robot, the controller including a processor for executing instructions stored in a memory component to (i) receive and analyze data received from the one or more vacuum sensors, the photoelectric sensor, and the ultrasonic sensor, and (ii) communicate instructions to the robot which causes the robot to move the end effector toward the parcel.

18. The system for engaging parcels as recited in claim 16, wherein the one or more vacuum cups includes:
a first vacuum cup including a foam lip; and
a second vacuum cup including an elastomeric lip.

* * * * *